US010086912B2

(12) United States Patent
Cardona

(10) Patent No.: US 10,086,912 B2
(45) Date of Patent: Oct. 2, 2018

(54) DEVICE OF USE IN TRANSPORTING AND/OR HANDLING MATERIAL IN AN UNDERWATER ENVIRONMENT FOR CARRYING OUT WORK

(71) Applicant: LIBERVIT, Perpignan (FR)

(72) Inventor: Yvan Cardona, Bompas (FR)

(73) Assignee: LIBERVIT, Perpignan (FR)

( * ) Notice: Subject to any disclaimer, the term of this patent is extended or adjusted under 35 U.S.C. 154(b) by 0 days.

(21) Appl. No.: 15/541,095

(22) PCT Filed: Feb. 2, 2016

(86) PCT No.: PCT/FR2016/050212
§ 371 (c)(1),
(2) Date: Jun. 30, 2017

(87) PCT Pub. No.: WO2016/124850
PCT Pub. Date: Aug. 11, 2016

(65) Prior Publication Data
US 2017/0369130 A1    Dec. 28, 2017

(30) Foreign Application Priority Data
Feb. 6, 2015 (FR) ..................... 15 50969

(51) Int. Cl.
*B63C 11/46*    (2006.01)
*B63B 22/20*    (2006.01)
(Continued)

(52) U.S. Cl.
CPC .............. *B63B 22/20* (2013.01); *B63B 35/44* (2013.01); *B63C 7/12* (2013.01); *B63C 11/52* (2013.01);
(Continued)

(58) Field of Classification Search
CPC ........ B63B 22/00; B63B 22/02; B63B 22/021; B63B 22/18; B63B 22/20; B63B 22/24;
(Continued)

(56) References Cited

U.S. PATENT DOCUMENTS 3,372,996 A * 3/1968 Barrett ....................... B01J 7/02
102/531
3,601,827 A    8/1971 Miller
(Continued)

FOREIGN PATENT DOCUMENTS

GB    2 118 871 A    11/1983
WO    79/01136 A1    12/1979

OTHER PUBLICATIONS

International Search Report dated May 5, 2016 for Application No. PCT/FR2016/050212.

*Primary Examiner* — Daniel V Venne
(74) *Attorney, Agent, or Firm* — Ladas & Parry LLP; Malcolm J. MacDonald

(57) ABSTRACT

The present invention provides a device useful for transporting and/or handling equipment in an underwater environment for performing work, the device comprising at least the following components:
 a floating hydraulic unit (1) comprising a first enclosure (1a), preferably with a cylindrical wall, containing an electrical pump unit (6), a battery (8) suitable for electrically powering the pump unit, and a fluid tank (7), preferably containing oil, said first enclosure (1a) being suitable for being made submersible by first ballast (16);
 at least one hydraulic tool (3) connected or suitable for being connected to at least one hydraulic coupling (11, 12) of said hydraulic unit via at least one flexible hose (30);

(Continued)

at least one independent float (4), preferably having a cylindrical wall, connected or suitable for being connected to said hydraulic tool (3) via a sling (5) of adjustable length, said float (4) being suitable for being made submersible by second ballast (43); and a wired remote control (2) for switching on or stopping the pump unit (6), said wired remote control comprising a handle (22) fitted with an electrical contactor (2*a*) at a first end of an electric wire (20), the second end of the electric wire (20) being connected or suitable for being connected at least to said pump unit (6).

15 Claims, 12 Drawing Sheets

(51) Int. Cl.
| | |
|---|---|
| *B63C 11/52* | (2006.01) |
| *B63B 35/44* | (2006.01) |
| *B63C 7/12* | (2006.01) |
| *B63G 8/08* | (2006.01) |
| B63C 11/08 | (2006.01) |
| B63G 8/24 | (2006.01) |
| H02K 5/132 | (2006.01) |

(52) U.S. Cl.
CPC ............... *B63G 8/08* (2013.01); *B63C 11/08* (2013.01); *B63G 8/24* (2013.01); *H02K 5/132* (2013.01)

(58) Field of Classification Search
CPC ..... B63B 22/26; B63B 2022/20; B63B 35/44; B63B 2035/44; B63B 2770/00; B63C 7/00; B63C 7/06; B63C 7/12; B63C 7/26; B63C 2007/00; B63C 2007/06; B63C 2007/12; B63C 11/00; B63C 11/02; B63C 11/08; B63C 11/18; B63C 11/20; B63C 11/207; B63C 11/30; B63C 11/48; B63C 11/52; B63C 2011/00; B63C 2011/02; B63C 2011/18; B63C 2011/30; B63G 8/00; B63G 8/08; B63G 8/14; B63G 8/24; B63G 8/36; B63G 8/40; B63G 8/41; B63G 8/42; B63G 2008/00; B63G 2008/001; B63G 2008/002; B63G 2008/004; B63G 2008/005; B63G 2008/007; B63G 2008/008; B63G 2008/40; B63G 2008/42; H02K 5/132

USPC .... 441/1, 3, 4, 5, 21, 23, 24, 25, 26, 28, 29, 441/32, 33, 136; 114/312, 313, 315, 321, 114/322, 326, 330, 331, 333, 334, 336

See application file for complete search history.

(56) References Cited

U.S. PATENT DOCUMENTS

| | | | | |
|---|---|---|---|---|
| 3,659,299 | A | | 5/1972 | Davidson et al. |
| 3,777,692 | A | * | 12/1973 | Baccaglini ............... B63C 7/10 114/54 |
| 4,615,292 | A | * | 10/1986 | Laukien .................... B63C 7/10 114/312 |
| 4,674,429 | A | * | 6/1987 | Buckle ...................... B63C 7/10 114/331 |
| 5,947,051 | A | * | 9/1999 | Geiger .................. B62D 57/00 114/222 |

\* cited by examiner

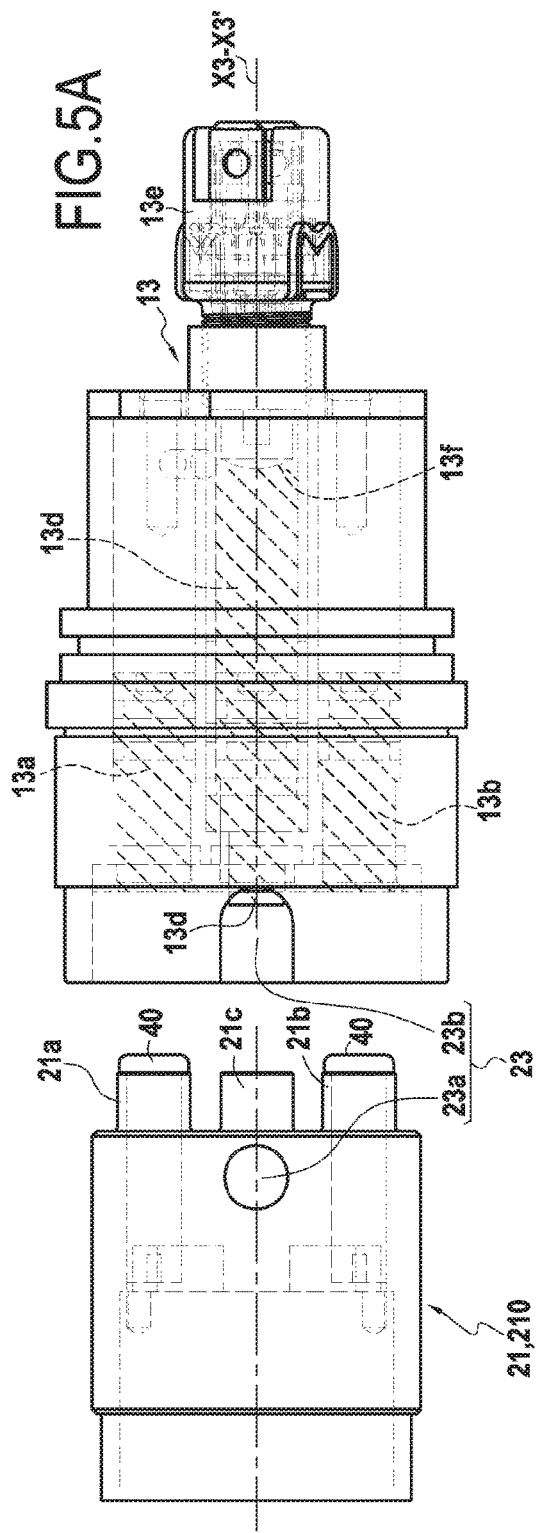
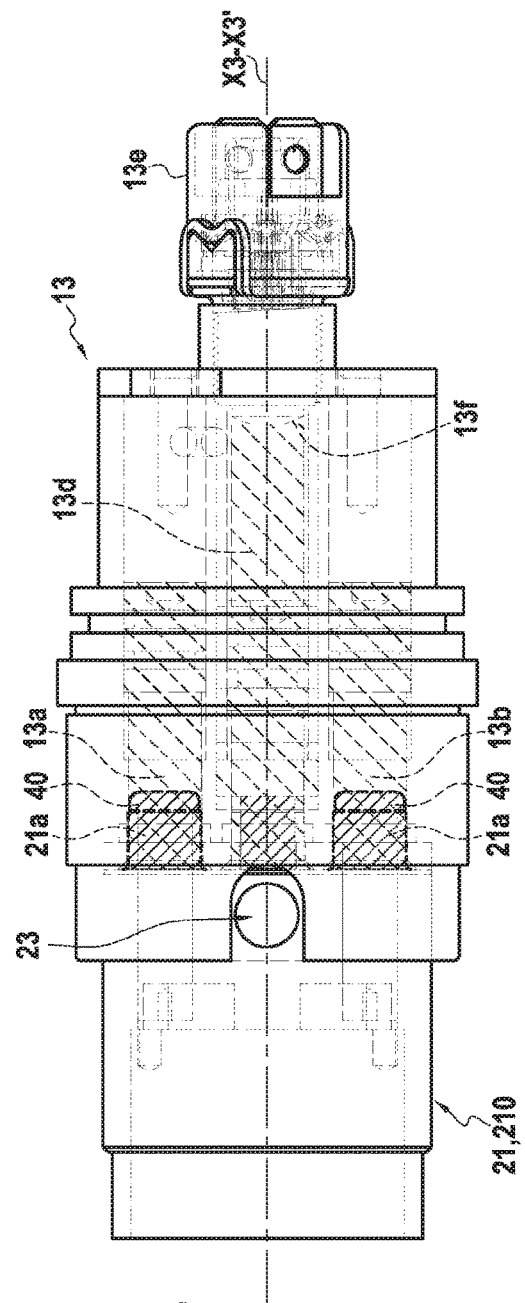

DEVICE OF USE IN TRANSPORTING AND/OR HANDLING MATERIAL IN AN UNDERWATER ENVIRONMENT FOR CARRYING OUT WORK

The present invention relates to a device useful for transporting and/or handling equipment comprising at least one tool, in an underwater environment, at sea or in a river, for performing work using said tool.

In its main application, the device of the invention serves to act in an underwater environment, e.g. in a shipwreck in order to release trapped divers or to recover equipment. And for a fire brigade, the device of the invention needs to be capable of being used to extract people quickly and easily from a vehicle that has fallen into the water, or in more particular circumstances to save people trapped in a vehicle by rising water. It may also be used to rescue visitors to wrecks sunken in reasonable depths lying in the range 30 meters (m) to 60 m, where such rescues are unfortunately needed quite frequently, in particular in the summer, with a diver becoming trapped in a wreck by metal items that have become unstable as a result of corrosion, and with another diver in a group having the time to return to the surface and call for help, such equipment enabling lifeguards to extricate the trapped diver. In addition, industrial applications for undersea work can also be envisaged.

Nevertheless, it should be specified that the device may also be dedicated to use on land or out of the water after being transported underwater from point A to point B and then for example hoisted on board a vessel so as to be used as power equipment on board the vessel.

In the present invention, the device needs to be capable of being used to perform work requiring power tools in an undersea environment to meet the requirements of fire brigade divers, and also the specific requirements of certain special naval units who need to work under conditions of surprise involving discretion and speed of action, both concerning getting into place and also performing the action. In particular, the device of the invention needs to make it possible to penetrate a vessel and overcome its crew with complete discretion, using shears or a spreader to damage a major component of a vessel, e.g. in the event of hostage-taking or a suspicion of illegal substances on the part of law enforcement agencies.

At present, existing devices are:
  either pneumatic tools with an air compressor remaining on the surface and connected to said tool to feed it with compressed air, which is not acceptable when total discretion is desired, and in particular silence, given that when such a tool is used in an underwater environment bubbles of air are produced;
  or else they are tools fitted with a manual pump incorporated therein, thus requiring the operator to perform pumping action, which can be complicated in an underwater environment.

The main object of the invention is thus to provide a device that is reliable in an underwater environment, that can be transported and operated discreetly in an underwater environment, and that can be handled quickly and easily by operators, both during a stage of approaching a site where action is to be taken, and also for performing the operation.

To do this, the present invention provides a device useful for transporting and/or handling equipment in an underwater environment for performing work, the device comprising at least the following components:
  a floating hydraulic unit comprising a first enclosure, preferably with a cylindrical wall, containing an electrical pump unit, a battery suitable for electrically powering the pump unit, and a fluid tank, preferably containing oil, said first enclosure being suitable for being made submersible by first ballast;
  at least one hydraulic tool connected or suitable for being connected to at least one hydraulic coupling of said hydraulic unit via at least one flexible hose;
  at least one independent float, preferably having a cylindrical wall, connected or suitable for being connected to said hydraulic tool via a sling of adjustable length, said float being suitable for being made submersible by second ballast; and
  a wired remote control for switching on or stopping the pump unit, said wired remote control comprising a handle fitted with an electrical contactor at a first end of an electric wire, the second end of the electric wire being connected or suitable for being connected at least to said pump unit.

The term "hydraulic unit", also referred to as a "hydro-electrical unit", is used herein to mean a set of components suitable for pressurizing a fluid in order to convey fluid under pressure from a tank to a tool that makes use of hydraulic energy, referred to as a "hydraulic tool", by means of a pump and via at least one hose.

It can be understood that said pump unit is suitable for pressurizing said fluid of the fluid tank in order to cause it to be conveyed to said hydraulic tool via said flexible hose.

The device of the invention makes it possible to transport and operate the various components of the equipment of the hydraulic unit and of the hydraulic tool in an underwater environment in easy and discreet manner, and to do so while controlling the depth of immersion with the help of said first ballast and said second ballast.

Using an independent float to support said tool is advantageous since it makes it possible:
  to avoid requiring the operator to support the weight of the tool, since the tool is as though it were suspended from a load balancer and it can be disconnected and connected at any time to the hydraulic hose connecting it to the hydraulic unit, in particular in order to change tool directly underwater; and
  to use a plurality of tools supported by a corresponding plurality of floats and to enable the operator to change tool without moving the hydraulic unit and/or to pass into or work in a space of small volume and/or of difficult access without moving the hydraulic unit into that space by operating the hydraulic unit remotely.

Each said float is connected to the tool by a sling of adjustable length, preferably by means of a system that is quick and manual, thus enabling the operator to move the tool away from or towards the float as a function of the location where action is to be taken.

In the absence of ballast, the float and the hydraulic unit can float and be made submersible by adding said ballasts, in particular ballasts of 50 grams (g) to 500 g for a tool weighing 10 kilograms (kg) to 15 kg, with a float weighing 1 kg to 5 kg and having a volume of 10,000 cubic centimeters ($cm^3$) to 15,000 $cm^3$, with a unit weighing 15 kg to 20 kg and having a volume of 15,000 $cm^3$ to 20,000 $cm^3$, thus making it possible to achieve buoyancy suitable for operating at a depth down to 50 m to 100 m.

Removing the ballast enables the tools and the hydraulic unit to be raised to the surface without needing to provide any force since they are buoyant when not ballasted. In addition, should that be necessary, adding a maximum amount of ballast makes it possible to cause the equipment to sink completely in order to make it disappear after the operation.

In addition, controlling buoyancy by adding or removing ballast is also advantageous for the desired criterion of discretion in the context of special operations, in comparison with a system having a supply of air that enables a volume of air to be varied in order to modulate buoyancy. Specifically, such systems having a supply of air lead to bubbles of air being generated when air is discharged, which bubbles are both visible and audible.

Finally, this system of modulating buoyancy by adding ballast presents the advantage of making it possible to modify the position of the hydraulic unit and/or of the float during transport and/or operating costs, in particular between a horizontal position for its longitudinal axial direction for horizontal movement and a vertical position for its longitudinal axial direction for vertical movement, as a function of the distribution of ballast in said compartments, as explained below.

More particularly, said hydraulic tool may for example be a tool of the clamp, shears, spreader, drill, saw, in particular a circular saw of the disk type, or jack type, or any other hydraulic tool suitable for opening a wall, a door, or a hatch, by cutting, hoisting, and/or thrusting.

For tools such as a clamp, shears, or a spreader, a single hose is needed in which the fluid advances under pressure and returns towards the tank along the same hose. For tools specifically requiring back-and-forth alternating motion, such as a drill or a saw, the hydraulic unit is also connected to the tool via a second coupling and a second hose for returning fluid to the tank.

The various tools, the floats, and said first enclosure are made of materials suitable for a water environment in fresh water or salt water, and they are subjected to anti-corrosion surface treatments guaranteeing a good lifetime.

Using hydraulic equipment is more reliable and more powerful than using electrical or pneumatic equipment for performing work that requires power tools and without generating nuisance. The advantage of a hydraulic transmission, which may also be referred to as a hydrostatic transmission, lies in unparalleled compactness, weight, and power transmitted, together with ease of installation, since transmission shafts, universal joints, pulleys, etc., are replaced by hydraulic flexible hoses or tubes, and also because of the wide variety of mechanical members that can make use of such power.

Preferably, the device of the invention comprises:
a first electrical connector is fastened to said first enclosure, said first electrical connector being connected at least to said pump unit and to the battery; and
the second end of the electric wire of said wired remote control is connected to a second electrical connector that may be male or female and that is suitable for being connected to said first electrical connector, which may be female or respectively male, at said hydraulic unit.

This embodiment is preferred since it makes it easier to transport and/or handle the hydraulic unit before operation and it makes it possible to change the wired remote control or its electric wire in order to adapt the length of the electric wire of the wired remote control as a function of the distance needed between the tool and the hydraulic unit, depending on the site of intervention.

Also preferably, said hydraulic unit includes a main circuit breaker switch accessible from said first enclosure for causing said pump unit to be electrically powered or not electrically powered by said battery, said remote control being suitable for switching on or off the pump unit when it is electrically powered by said battery via said main switch.

This embodiment is advantageous since it makes it possible to obtain an emergency stop switch, which requires wiring of greater section than that of the wired control, and would be awkward to position remotely via the wired remote control.

Also preferably, said first electrical connector has two first electrical contact terminals, which are not electrically connected together in said first connector in the absence of said second connector being connected in said first connector, and that become electrically connected together and thus suitable for transmitting the on/off command for said pump unit from said remote control only once said second electrical connector of said wired remote control is connected to said first connector.

Nevertheless, it can be understood that connecting together the first and second connectors serves to enable the pump unit to operate, providing said remote control is operated to switch the pump unit on and also providing the pump unit is electrically powered by said battery via said main switch of the hydraulic unit.

Thus, said first connector is electrically disconnected when not connected to said second electrical connector of the wired control, thus providing safety in the event of the pump unit being immersed and under power, while said second connector of said wired control is not connected with said first electrical connector. Specifically, there is thus no risk of a short circuit or of electrolytic phenomena that could damage said first connector in an immersed position if a user were to put the hydraulic unit into water without remembering to switch off the power via the general circuit breaker switch. Such an electrolytic phenomenon might destroy the electrical terminals of the first connector that are used for providing contact when connecting the wired remote control, and this can happen in only a few minutes.

More particularly, said first electrical connector is a female connector having two first contact terminals at the bottoms of two first cavities, and a first stud movable in translation within a third cavity of said first connector, said movement in translation of said first stud enabling the electrical contact connection to be established between the two first terminals of the first connector, and said second electrical connector is a male connector having two male second terminals suitable for contacting said first terminals within said first cavities, and an abutment element suitable for moving said first stud within said third cavity enabling the electrical contact connection to be established between the two first terminals of the first connector when said second connector is connected to said first connector.

More particularly, the movement in translation of said first stud in translation within a third cavity actuates a button of a switch that provides continuity of the electrical connection of an electric wire connecting one of said first terminals to the battery.

More particularly, said battery is suitable for being charged by an independent charger comprising a third electrical connector suitable for being connected to one of the two first terminals connected to the battery and to a third terminal of the first connector that is connected to the other pole of the battery.

Preferably, said fluid tank of the hydraulic unit includes a movable piston suitable for being moved by a spring so as to confine the fluid permanently in a space that is completely filled with fluid.

This specific tank makes it possible to change the position of the hydraulic unit, while guaranteeing proper operation of the tools regardless of the position of the hydraulic unit. This piston-spring system is preferred over a bladder system that would be more fragile or over a pressurized system that might lead to leaks and that could also be affected by temperature variations.

Also preferably, said wired remote control comprises a handle suitable for being fastened to said hydraulic tool.

This makes it possible to operate said tool by relying on said electrical contactor, which operates to switch the pump unit on while it is held pressed down by the operator.

More particularly, said hydraulic tool comprises a coupling suitable for enabling said handle to be fastened to said tool via a coupling of said handle, the coupling enabling locking and unlocking to be performed by combined movement in translation and in rotation of the coupling of the handle relative to the coupling of the hydraulic tool, and said fastening of the handle enabling the handle to move in rotation relative to the tool once said handle is locked, said movement in relative rotation of the handle being suitable for controlling the passage of oil via the hydraulic coupling of the tool and said flexible hose at least for returning oil to the hydraulic unit.

Still more particularly, said first enclosure of said hydraulic unit is cylindrical in shape and includes a plurality of first lateral external compartments that are accessible from the outside, preferably in the form of pockets in a covering that covers the enclosure and suitable for receiving said first ballast, said compartments being positioned and distributed in such a manner as to be capable of causing the axial longitudinal direction ($X_1X_1'$) of said first enclosure to adopt a horizontal position or a vertical position depending on the positioning and the quantity of said first ballast in the various first external compartments.

Still more particularly, said float is cylindrical in shape and includes second lateral external compartments accessible from the outside, preferably in the form of pockets of a covering that covers the float, suitable for receiving said second ballast, and said float including at least two fastener hooks suitable for enabling one end of said sling to be fastened thereto, said hooks being positioned in such a manner as to enable the axial longitudinal direction ($X_2X_2'$) of the float to adopt a horizontal position or a vertical position depending on the positioning of the sling on one or the other of said hooks and depending on the positioning and the quantity of said second ballast in the various second external compartments.

The vertical position may be advantageous for passing into a narrow space, while the horizontal position may be advantageous for passing into or working in a space of low height.

Still more particularly, said hydraulic tool is selected from shears, a clamp, a spreader, a jack, a drill, and a saw.

Still more particularly, the device of the invention includes a second hose for returning fluid from said tool to said tank of the hydraulic unit when said tool is selected from a drill or a saw.

For shears, a clamp, or a spreader, a single-acting connection suffices, with only one hose for delivering and returning oil between the hydraulic unit and the tool.

The present invention also provides a method of transporting and/or performing work in an underwater environment using a device of the invention, wherein said components are transported in an underwater environment together with at least said hydraulic tool suspended from said float in an underwater position.

More particularly, in a method, the device is used for taking action underwater, preferably down to a depth of 100 m, by adjusting the immersion depth of said hydraulic unit and of said float by controlling their buoyancy by adding said first ballast and said second ballast in said first and second compartments and by adjusting the length of said sling providing the connection between said hydraulic tool and said float.

Other characteristics and advantages of the present invention appear better on reading the following description made by way of non-limiting illustration and with reference to the following accompanying drawings.

Figure 1A:
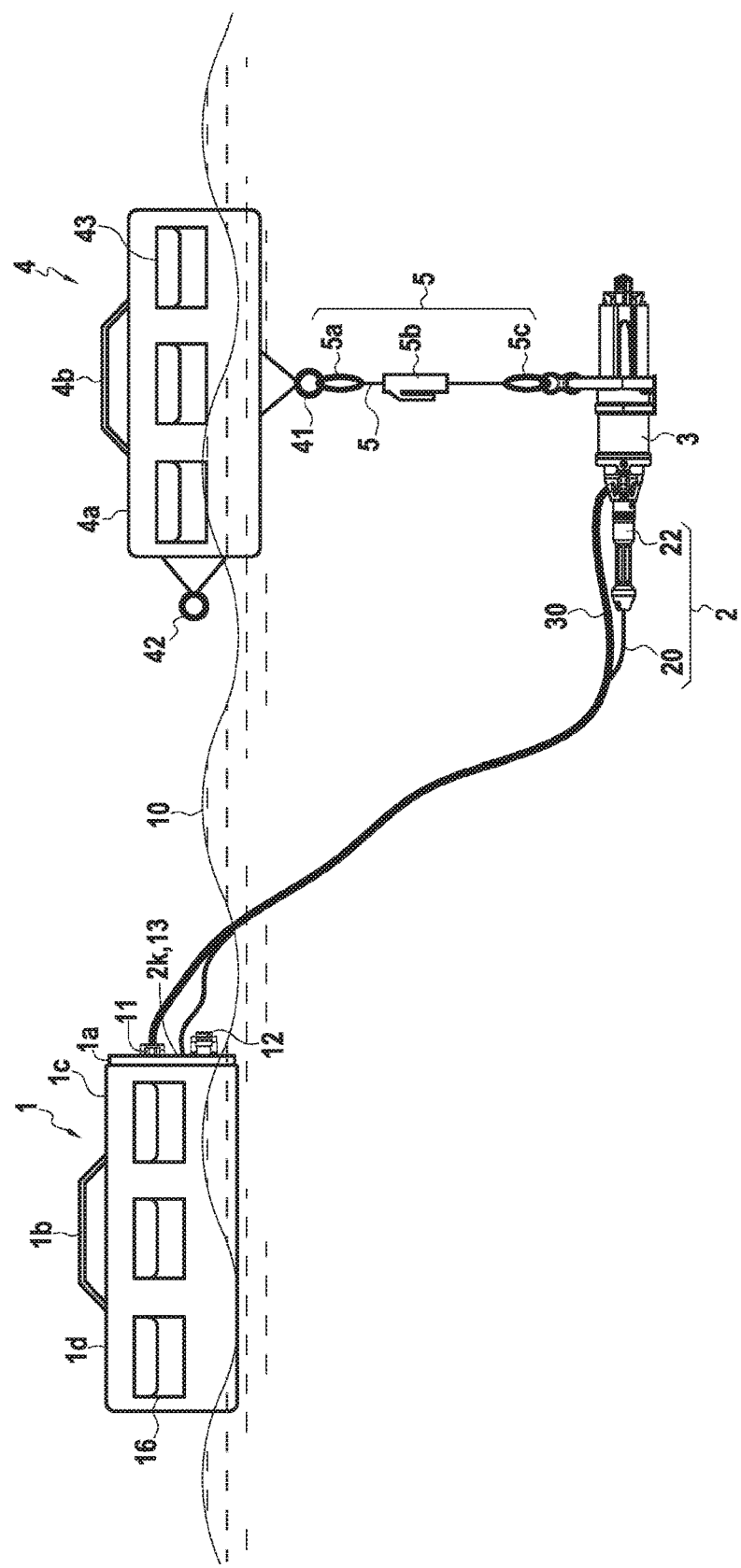
FIG. 1A is a diagram of the device of the invention during a stage of travelling on the surface.
Figure 1B:
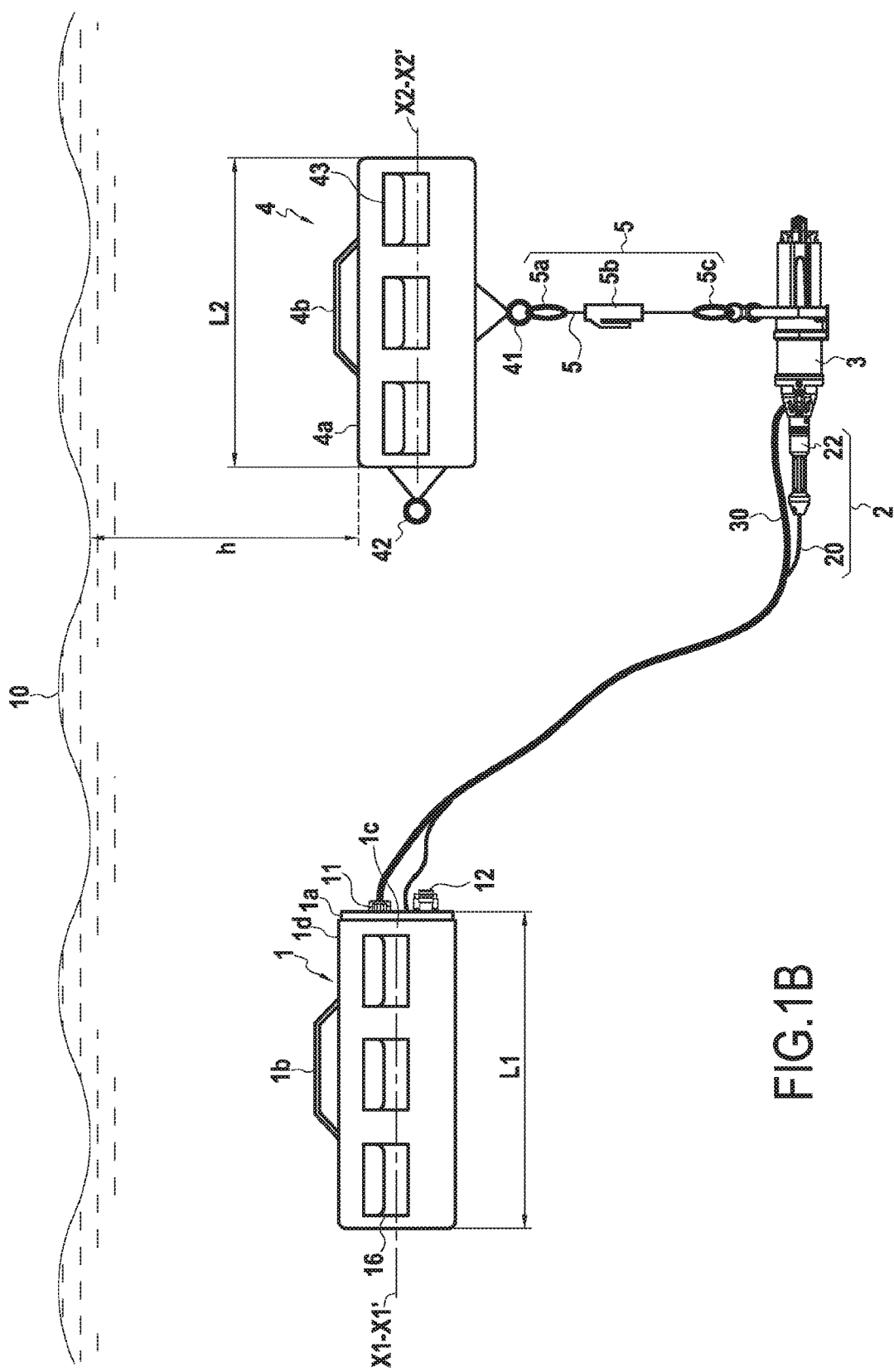
FIGS. 1B and 1C are diagrams showing the device of the invention during a stage of becoming immersed in the sea with the float in a horizontal position (FIG. 1B) and with the float in a vertical position (FIG. 1C).
Figure 1C:
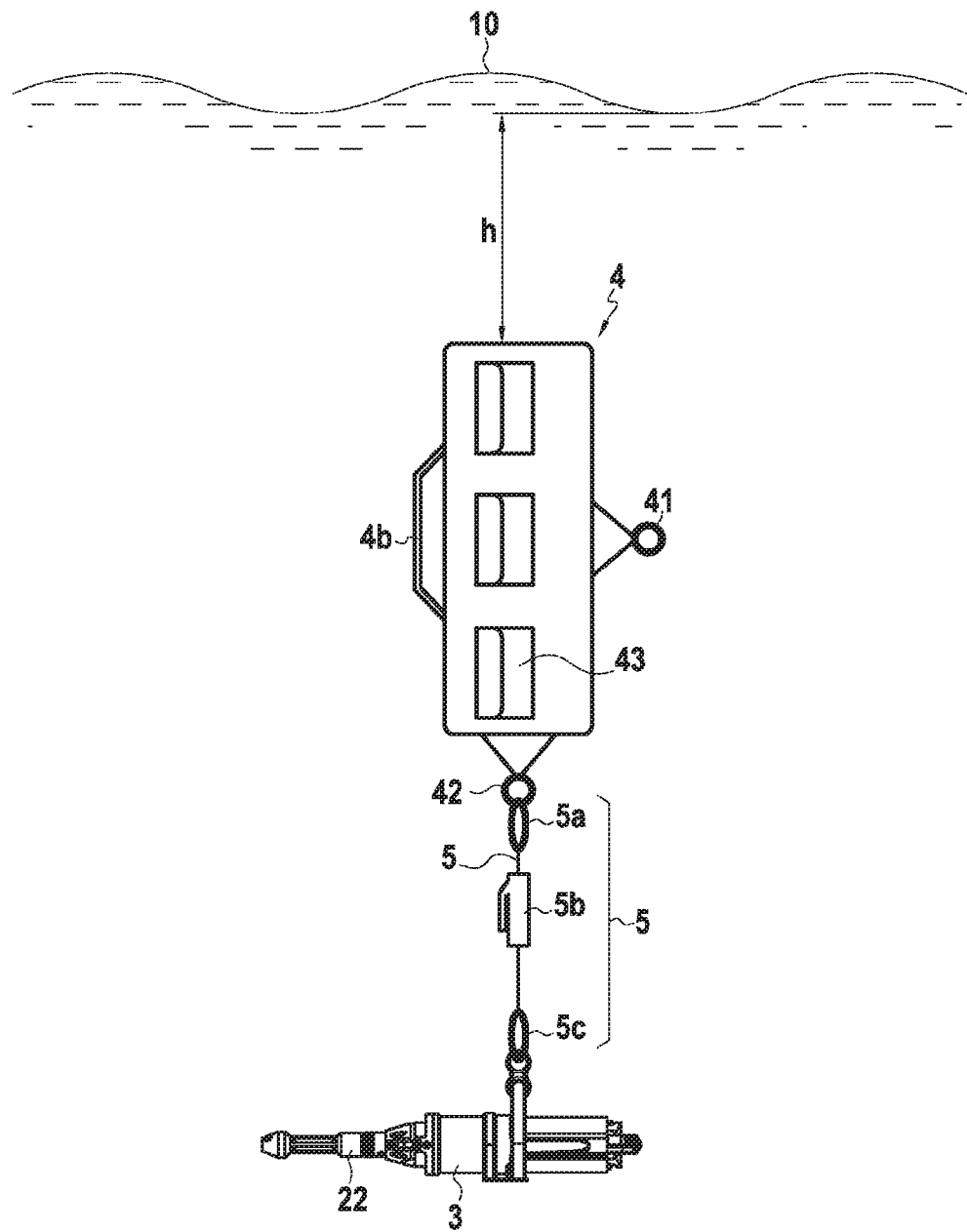
Figure 2A:
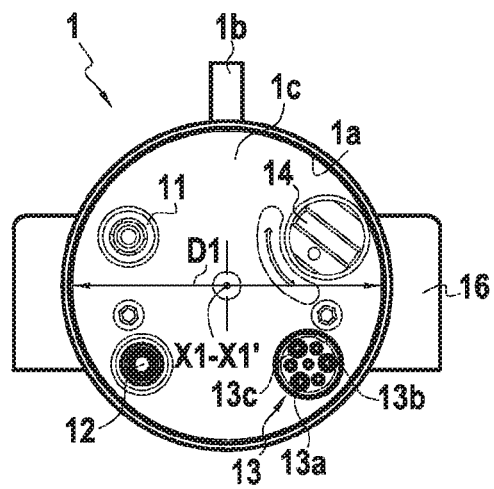
FIGS. 2A and 2B are views of the hydraulic unit (FIG. 2A) and of the float (FIG. 2B) showing their end faces along the longitudinal axis $X_1X_1'$ for the hydraulic unit (FIG. 2A) and $X_2X_2'$ for the float (FIG. 2B).
Figure 2B:
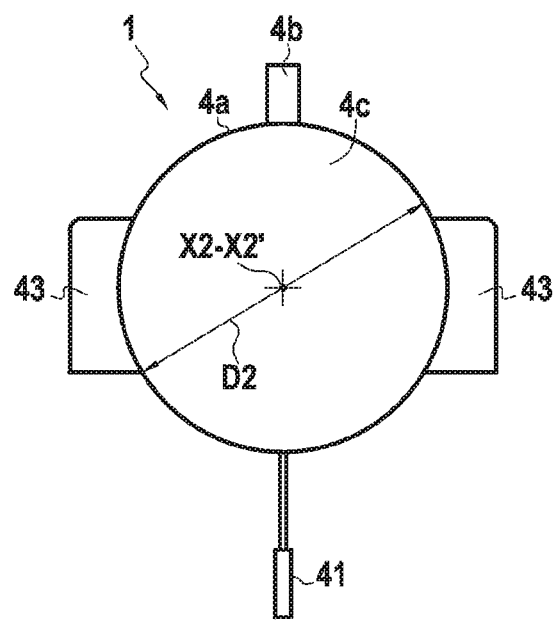
Figure 3:
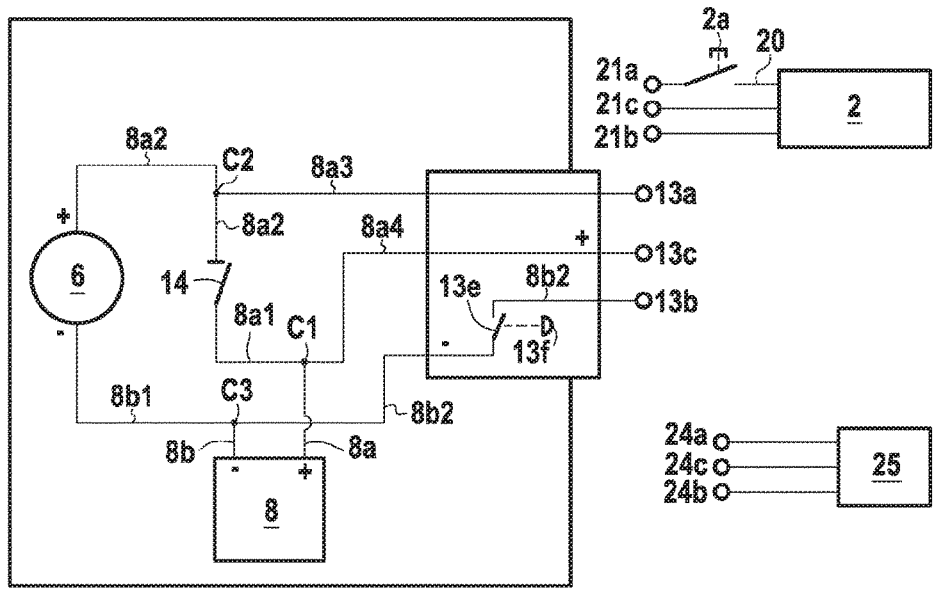

FIG. 3 is a simplified electrical circuit diagram showing the pump unit 6, the battery, the first electrical connector 13, and the remote control 2.

Figure 4A:
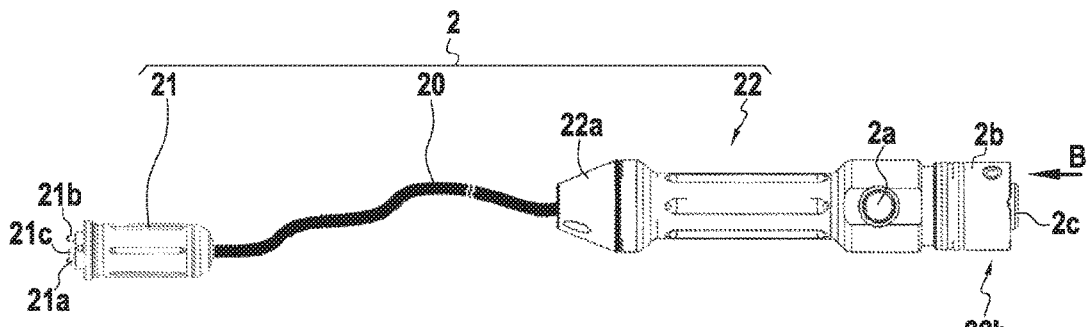

FIG. 4A is a view of the wired remote control 2 with a control handle 22 connected to an electrical connector 21 by an electric wire 20.

Figure 4B:
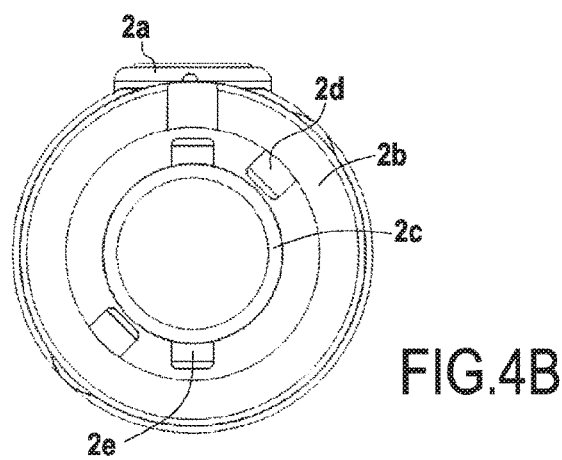

FIG. 4B is an end view of the coupling 2b of the handle 22 for locking the handle 22 on the hydraulic tool 3.

Figure 4C:
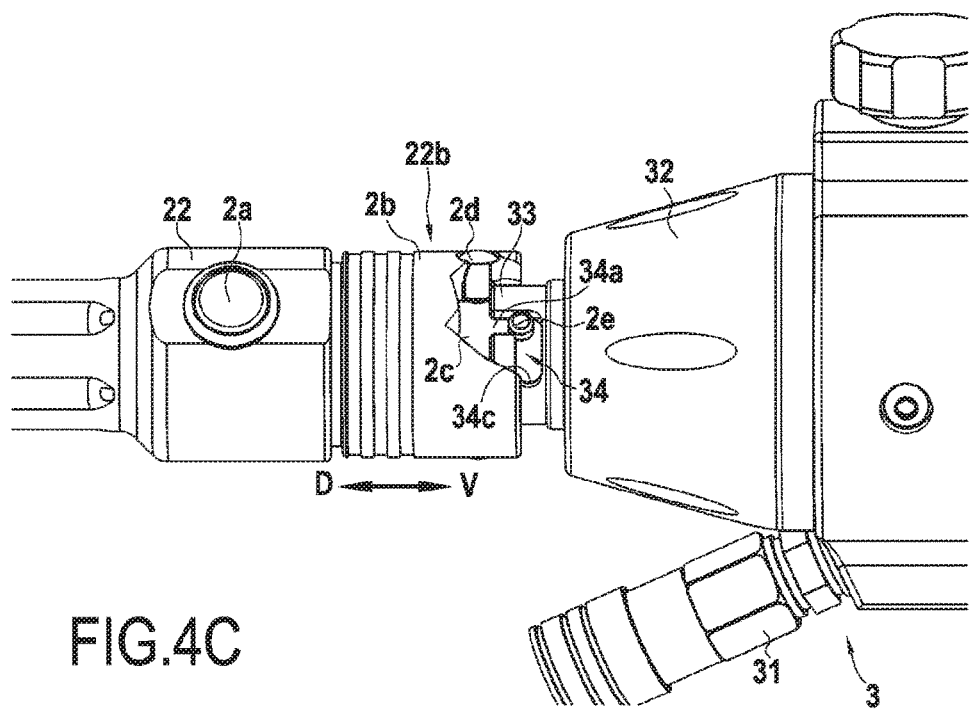
Figure 4D:
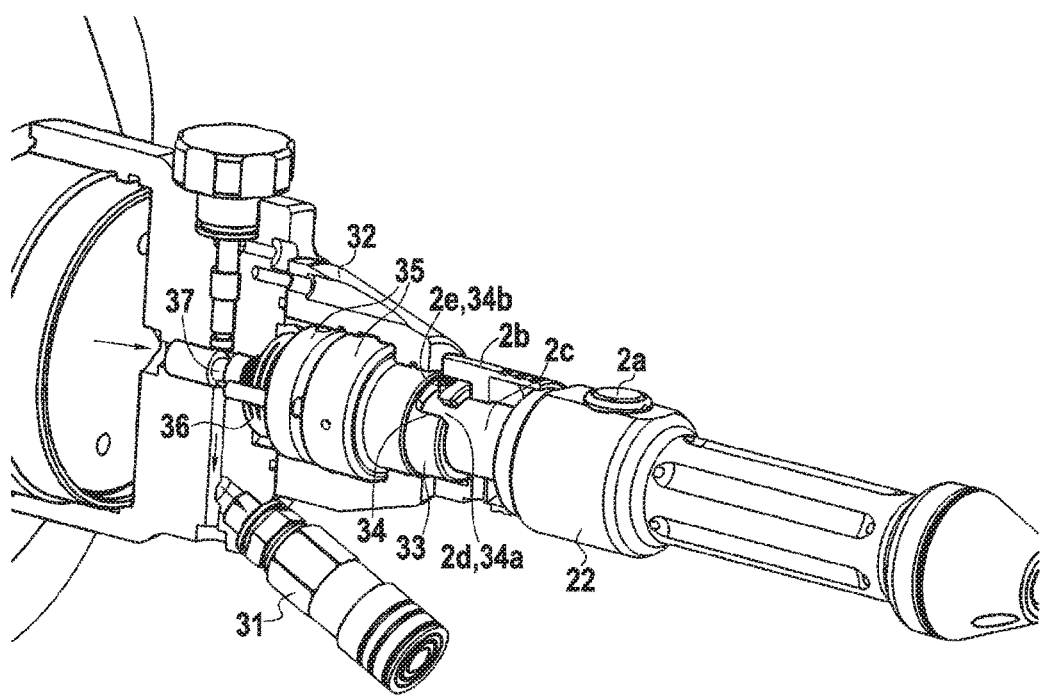

FIGS. 4C and 4D are fragmentary exploded views showing the detail of the coupling between the handle 22 and the tool 3 during locking (FIG. 4A) and after locking (FIG. 4B).

FIGS. 5A and 5B are side views of the end 210 of the electrical connector 21 of the handle 22 and of a complementary electrical connector 13 of the hydraulic unit 1, prior to connection (FIG. 5A) and after they have been connected together (FIG. 5B).

Figure 5C:
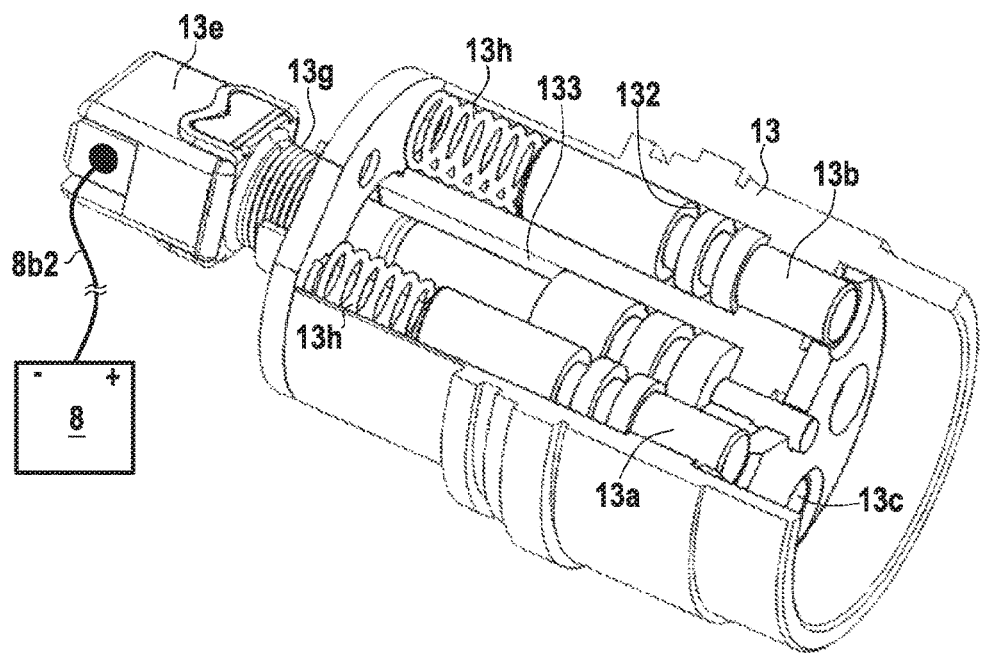
Figure 5D:
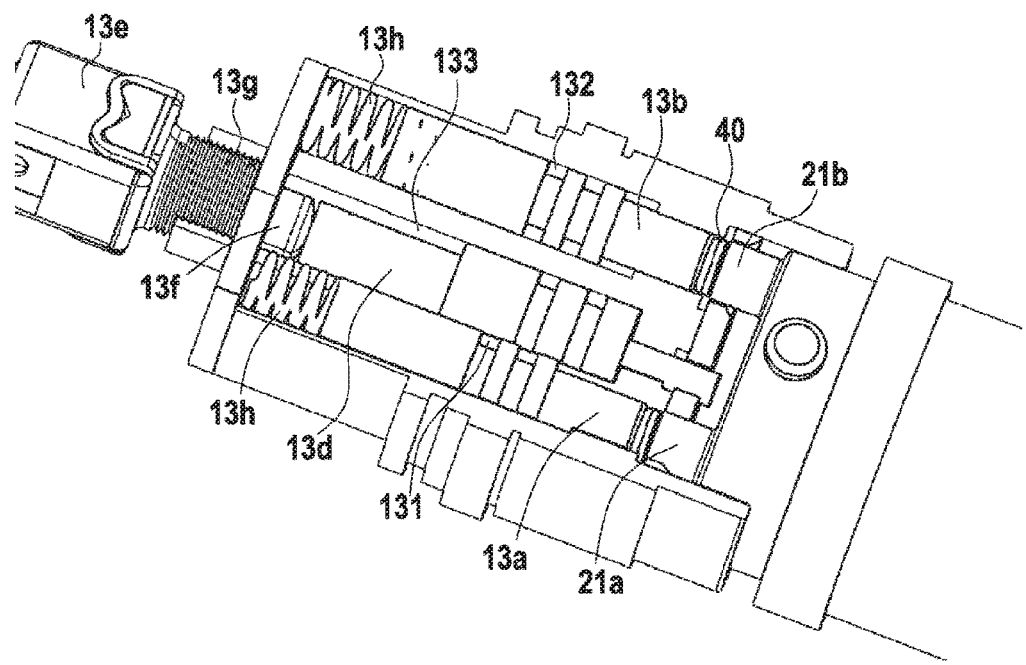

FIGS. 5C and 5D are exploded views showing the inside of the first connector 13 prior to connection (FIG. 5C) and during connection (FIG. 5D) with the second connector 21.

Figure 6A:
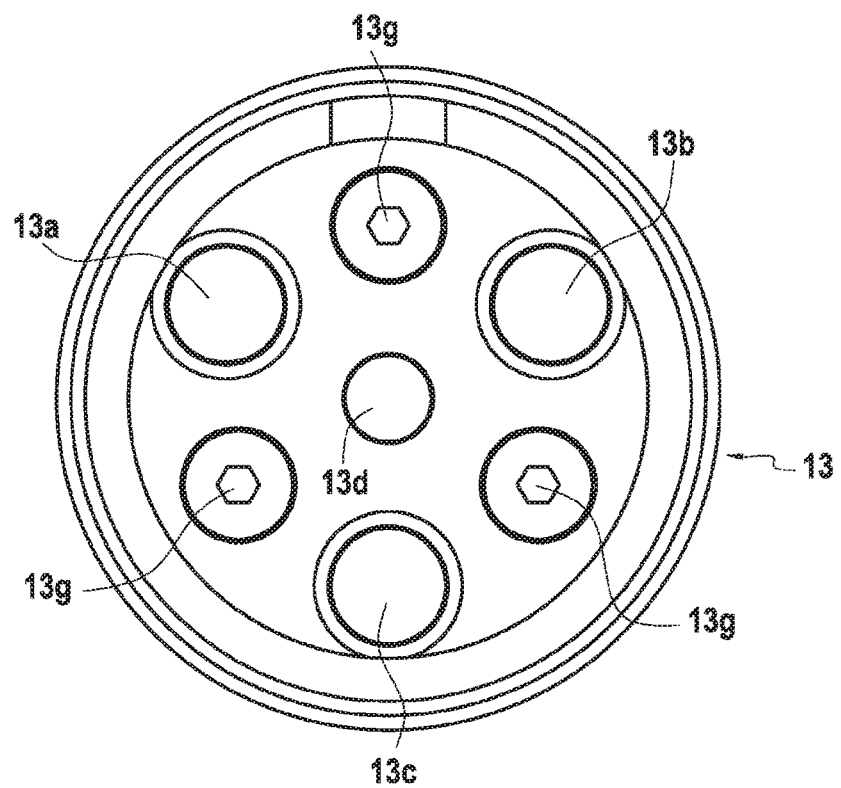

FIG. 6A is an end view of the connector 13 and of the end face 1c of the hydraulic unit 1.

Figure 6B:
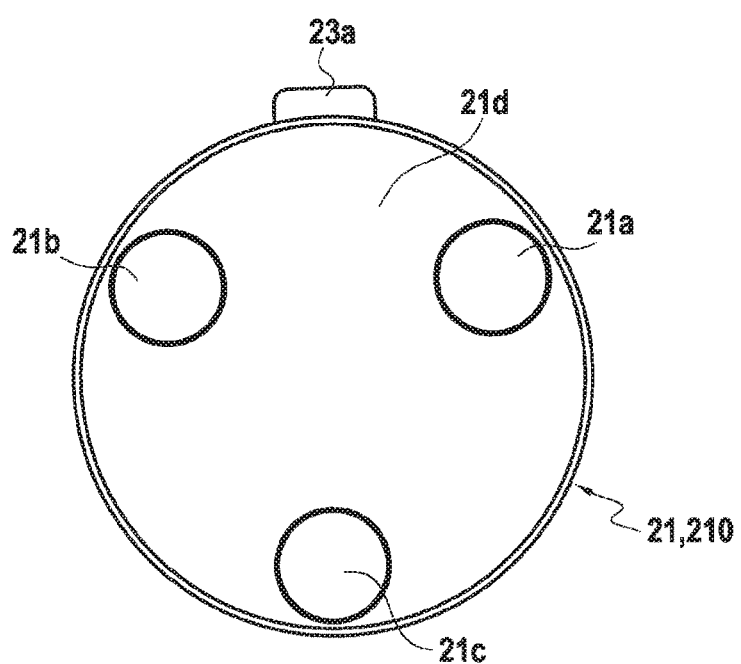

FIG. 6B is an end view of the end part 210 of the electrical connector 21 connected to the control handle 22.

Figure 7:
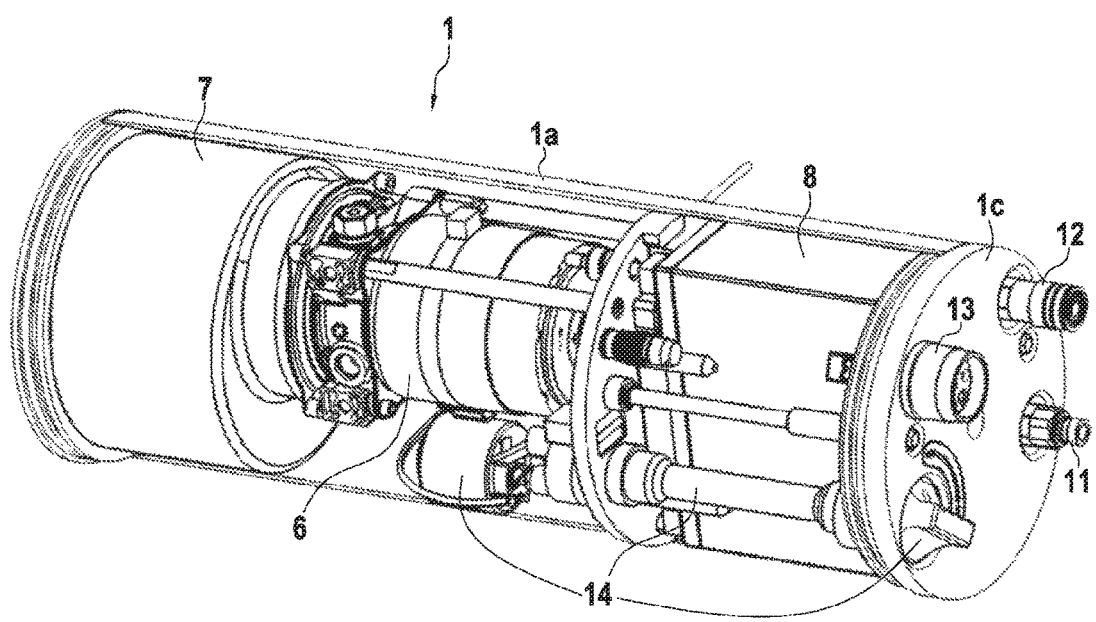

FIG. 7 is a view showing the various elements inside the hydraulic unit 1.

Figure 7A:
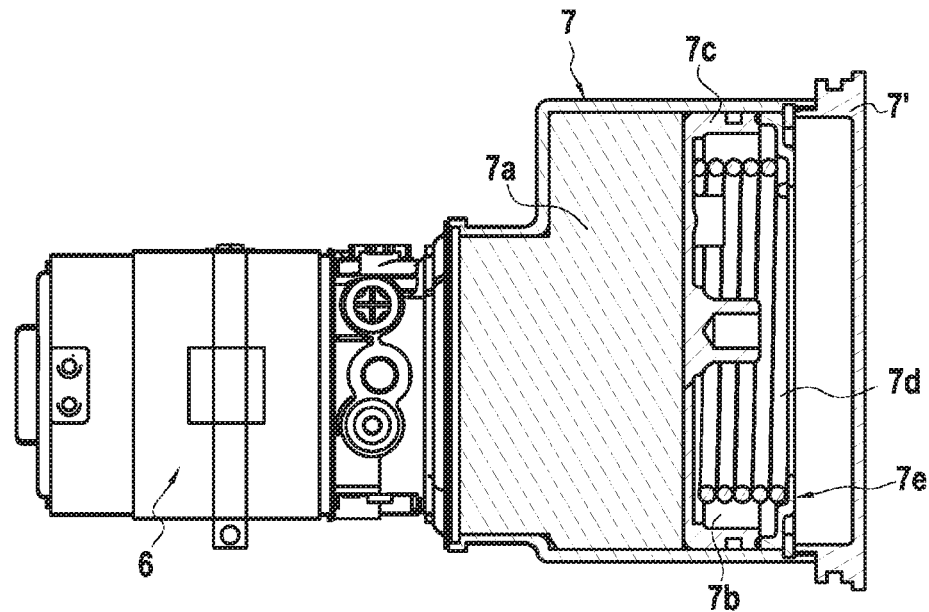
Figure 7B:
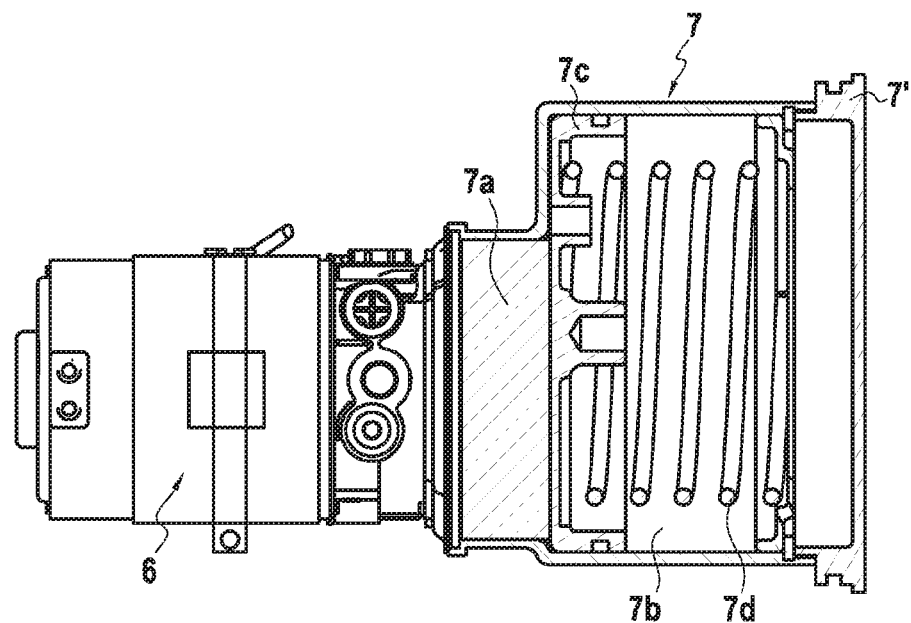

FIGS. 7A and 7B are longitudinal section views of a portion of the hydraulic unit 1 comprising the pump unit 6 and the oil tank 7 shown when full (FIG. 7A) and when partially empty (FIG. 7B).

Figure 8A:
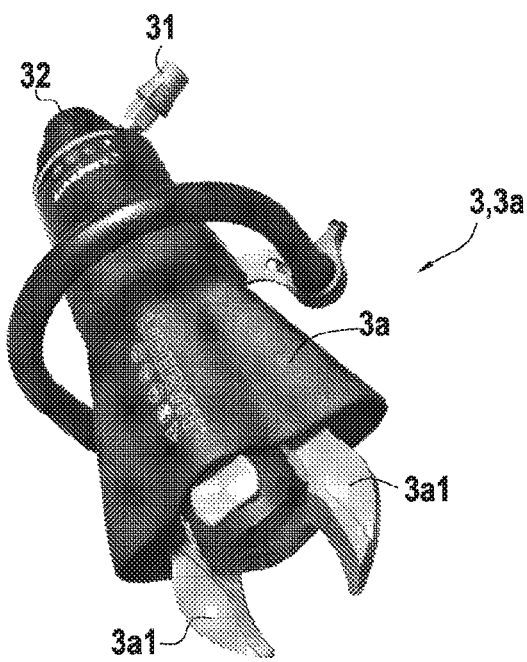
Figure 8B:
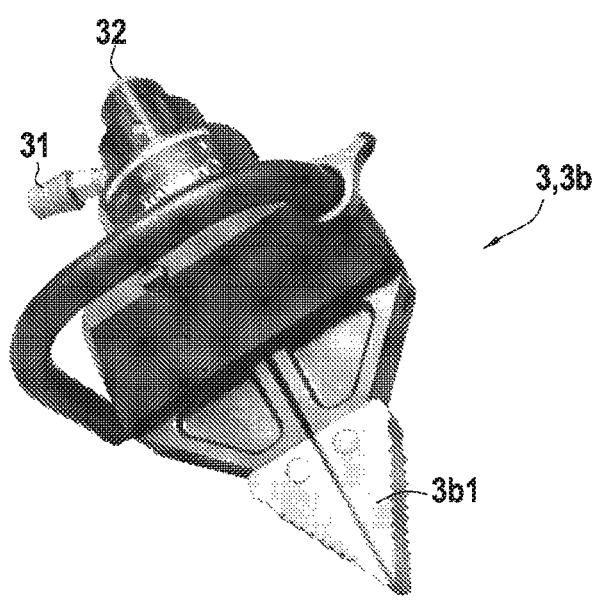

FIGS. 8A and 8B are views of hydraulic shears 3a (FIG. 8A) and of a hydraulic spreader 3b (FIG. 8B).

The underwater environment device of the invention as shown in FIGS. 1 to 8 comprises the following components.

A hydraulic unit 1 comprises a first enclosure 1a made of composite material comprising a cylindrical side wall of circular section having a first end face 1c at one of its longitudinal ends. The cylindrical side wall 1a and the second end face at the other longitudinal end of the first enclosure 1a are covered in a covering 1d. The covering 1d has six side pockets 16, there being three pockets on each longitudinal side that are arranged side by side in the longitudinal direction $X_1X_1'$ of said cylindrical wall and diametrically opposite the other three pockets on the other side. A top handle 1b of the covering enables said hydraulic unit 1 to be handled on land.

Said first enclosure 1a contains a 12 volt (V) and 900 watt (W) pump unit 6 sold by the supplier HPI (France), a 1.5 liter (L) oil tank 7, and a battery 8 of low voltage (12 V) and capable of delivering 17 amp-hours (A/h).

The pockets 16 have opening flaps that are reversible so as to make it possible to place ballast therein, in particular in the form of bags of granulated metal (stainless steel shavings) of weight in the range 50 g to 500 g.

The first enclosure 1a is of a size such that said hydraulic unit, which weighs 15 kg to 20 kg, floats in the absence of ballast in said pockets 16. The length L1 of the first enclosure lies in the range 50 centimeters (cm) to 100 cm and more particularly is 60 cm, and its diameter D1 lies in the range 15 cm to 20 cm, and more particularly is 16 cm.

The device of the invention comprises one or more independent floats 4 likewise having a cylindrical side wall of circular section, of length L2 and of diameter D2 covered by a covering of textile material including side pockets 43 suitable for receiving second ballast. Each covering has six pockets 43 comprising three side pockets arranged in succession in the longitudinal direction $X_2X_2'$ on either side of the cylindrical wall, the three pockets on each side being diametrically opposite pockets on the other side. Said cylindrical wall of the float 4 includes at least two hooks 41 and 42, one of them, 42, being located substantially in register with the center of a circular end wall at one of the longitudinal ends of the float, and the other one of them, 41, being in register with the middle of the length of the cylindrical longitudinal side wall of the float. A top handle 4b diametrically opposite the hook 41 enables the float to be handled on land. These hooks 41 and 42 serve to attach a snap hook 5a at one end of a sling 5. The other end of the sling 5 is fastened via a second snap hook 5c to a hydraulic tool 3 that is described below. The length of the sling 5 is adjustable by means of a length adjustment device 5b.

The hydraulic unit 1 and the float 4 can adopt a horizontal position with their longitudinal direction $X_1X_1'$ or $X_2X_2'$ in a horizontal position or in a vertical position. In particular, as a result of its longitudinal cylindrical side wall, the float 4 may adopt a position with its longitudinal direction $X_2X_2'$ in a vertical position when the sling 5 is fastened to the end hook 42, and conversely, a horizontal position when the sling 5 is fastened to the bottom hook 41. Likewise, as a result of having a longitudinal cylindrical side wall, the hydraulic unit 1 can adopt either the horizontal or the vertical position. In order to encourage the horizontal position, the ballast should be distributed uniformly in terms of the same weight in the various pockets 16 along the longitudinal direction $X_1X_1'$ of the hydraulic unit 1 and correspondingly the pockets 43 along the longitudinal direction $X_2X_2'$ of the float 4. In contrast, in order to encourage the vertical position, it is possible to put greater weight close to the longitudinal end that is to be the lower end. Nevertheless, in practice, the longitudinal position is associated with the traction supplied by the suspended tool, such that the weight can be located equally well in any of the pockets, without having any impact on the balance of the float and tool assembly.

In order to transport the equipment from a point A to a point B in an underwater position but at a depth of immersion that is substantially constant, it is preferable for the float 4 and the unit 1 to adopt a horizontal position. In contrast, in order to move the equipment from a point A to a point B at different depths of immersion and arranged along a vertical direction, it is preferable to arrange the float 4 and the hydraulic unit 1 in a vertical position. For the hydraulic unit 1, it is the end face 1c that includes the hydraulic couplings 11, 12 and the first connector 13 that should occupy the bottom position.

A float 4 of dimension L2=50 cm to 100 cm and D2=15 cm to 30 cm suffices to support a tool weighing 10 kg to 15 kg suitable for being immersed down to 50 m to 100 m with a total quantity of ballast in the pockets 43 lying in the range 250 g to 750 g.

The hydraulic tool 3 may be shears 3a as shown in FIG. 8A or a spreader 3b as shown in FIG. 8B. In the shears 3a, the two pivotal blades 3a1 are spaced apart in the rest position and the two blades 3a1 are suitable for being moved towards each other by pivoting under the effect of oil pressure delivered by a flexible hose 30 from the hydraulic unit 1. Conversely, in the spreader 3b, the two blades 3b1 are close together in the rest position and they are suitable for being spaced apart by pivoting under the effect of oil under pressure conveyed by the flexible hose 30 so that their serrated outside faces are effective in a spreading operation. The shears 3a and the spreader 3b are connected to the hydraulic unit 1 via a single flexible hose 30 passing via the hydraulic coupling 11 of the hydraulic unit 1 from a coupling 31 of the tool 3.

Other tools that are not shown, such as a drill, a saw, or a jack can require a second flexible hose to return oil to the hydraulic unit via the second hydraulic coupling 12.

The longitudinal end face 1c of the first enclosure 1a of the hydraulic unit 1 presents:
  two hydraulic couplings 11 and 12 enabling two flexible hoses to be coupled, including at least one flexible hose 30 conveying oil from the tank 7 via a first coupling 11 to a hydraulic tool 3, and where appropriate, if necessary, returning oil via a second flexible hose (not shown) from said tool 3 via the second coupling 12; and
  a first electrical connector 13, described below, that is electrically connected to the pump unit 6, and fastened to the end face 1c by fastener screws 13g; and
  a circuit breaker switch 14 suitable for switching on or stopping in an emergency (switching off) the relay 6a and thus the pump unit 6 relative to its power supply from the battery 8.

A wired remote control 2 is suitable for switching on or off the pump unit 6 when it is electrically powered via the main switch 14. The wired control 2 comprises:
  a handle 22 connected firstly via a mechanical coupling 22b to a hydraulic tool 3 and secondly to a second electrical connector 21 via an electric wire 20; and
  a second electrical connector 21 suitable for connecting to said first electrical connector 13.

The handle 22 of the remote control 2 comprises a coupling 22b enabling it to be coupled with a coupling 32 of the hydraulic tool 3. The coupling 22b has a peripheral first ring 2b that is movable in translation with two locking studs 2d mounted radially on the ring 2b in diametrically opposite positions. The coupling 22b also has an axial second ring 2c that is stationary inside the movable ring 2b having two locking studs 2e mounted radially on the axial second ring 2c in diametrically opposite positions and angularly offset relative to the two studs 2d. The studs 2d and 2e co-operate with a notch 34 in a third ring 33 of the coupling 32 of the tool 3 and enable the couplings 22b and 32 to be put into a locking position and into an unlocking position relative to each other using one hand only by performing a combination of movements in translation and in rotation.

More precisely, as shown in FIGS. 4C and 4D, single-handled locking and unlocking operates on the following principle. The stud 2e is positioned facing the opening 34a of the notch 34 in the third ring 33 by turning the handle 22, with the stud 2d pushing against the third ring 33 so as to cause the movable first ring 2b to move back automatically.

At this moment, it is necessary to turn the handle 22 in the direction F. Thus, the stud 2e is moved towards the bottom 34b of the notch 34 that is transversely offset relative to the access opening 34a. In addition, under thrust from an internal spring, the movable first ring 2b serves to insert the stud 2d into the opening 34a of the notch 34 in the split ring 33. Thus, the handle 22 is locked against movement in rotation by the stud 2d and against movement in translation by the stud 2e. In order to proceed with unlocking, it is necessary to pull the movable ring 2b in the direction D, to turn the movable ring 2b in the direction O, and then to extract the handle 22.

In FIG. 4D, when the handle 22 is locked on the coupling 32 of the tool, it is possible to adjust the opening of a ball valve 37 controlling the passage of return oil to the coupling 31 and the flexible hose 30 leading to the hydraulic unit. This opening of the valve 37 is controlled by turning valves 35 mounted on a thread and co-operating with a spring 36 as follows. The spring 36 holds the valves 35 by default in the position for closing the valve 37. Rotation about the longitudinal axis of the handle 22 relative to the coupling 32 causes the third ring 33 and the valve 35 to move in rotation relative to the coupling 32, thus making it possible to move and stress the spring 36, thereby opening the valve 37.

Even if users have just put the hydraulic unit into the water without remembering to disconnect the first connector 13 electrically using the general circuit breaker 14, in order for it to be possible for the wired remote control 2 to be connectable and disconnectable manually while in the immersed position, it is essential to ensure that no short circuit phenomenon or electrolytic phenomenon damages the electrical terminals of the first connector 13. To satisfy this problem, the inventors have developed a female first connector 13 provided with three contact terminals 13a, 13b, and 13c in cavities 131, 132, and 133, that are connected to and co-operate with the battery 8, the switch 14, and the pump unit 6 as shown in the diagram of FIG. 3, as described below.

The first connector 13 has two terminals 13a and 13b suitable for co-operating with male terminals 21a and 21b of the second connector 21 of the wired remote control 2. The connector 13 also has a third terminal 13c that, in combination with the terminal 13b, is suitable for connecting with terminals 24b and 24c of a third electrical connector 24 of a charger device 25 for charging the battery 8 when the hydraulic unit 1 is not in water.

The three terminals 21a, 21b, and 21c of the male second electrical connector 21 are arranged relative to one another in such a manner as to be capable of co-operating with the terminals 13a, 13b, and respectively 13c of the female first connector 13 by entering into the cavities 131, 132, and 133 when the second connector 21 is connected to the first connector 13 by creating contact that interengages the terminals 21a and 21b and the terminals 13a and 13b.

Keying means 23 comprising a lateral male element 23a on the side wall of the second connector 21 and a complementary female element 23b in the first connector 13 facilitates guidance of coupling between the two connectors.

Because the first connector has three female terminals, a third male terminal 21c is added to the second connector 21 and a third male terminal 24a is added to the second connector 24, neither of which is involved in electrical connection but both of which serve solely as keying means and to contribute to making the connections watertight when connecting the second and third electrical connectors 21 and 24 with the first electrical connector 13.

A wire 8a connects the positive pole of the battery 8 to a wire 8a1 at c1, which wire 8a1 goes to a circuit breaker switch 14. A wire 8a2 connects the circuit breaker switch 14 to the pump unit 6. The positive pole of the battery 8 is thus connected to the pump unit via 8a, 8a1, 14, and 8a2 in succession.

A wire 8a3 connects the terminal 13a of the first connector to the wire 8a2 at c2 after the switch 14, such that the terminal 13a is connected to the pump unit 6 via the wires 8a3 and 8a2. Specifically, the pump unit 6 co-operates with a solenoid valve (not shown) that allows oil to pass when the pump unit 6 is electrically powered and switched ON. The wire 8a3 provides the electrical connection between the terminal 13a and said solenoid valve, which is connected to a starter relay (not shown) for the pump unit at c2.

A wire 8b connects the negative pole of the battery 8 to a wire 8b1 at c3, which joins the pump unit 6. A wire 8b2 connects the wire 8b1 at c3 to a switch 13e of the first connector 13 and then to the terminal 13b of the first connector 13.

When the switch 14 and/or the switch 13e is open (electrical power supply interrupted, circuit-breaker OFF), the battery 8 is no longer electrically powered and the terminals 13a-13b are ineffective for powering the pump unit 6 while the terminals 21a and 21b of the second connector 21 are connected to the terminals 13a and 13b of the first connector 13. When the switch is closed (circuit breaker ON), the pump unit is electrically powered and switching on the motor of the pump unit 6 further requires the relay to be activated by an electrical signal coming from the terminal 13a.

A wire 8a4 connects the wire 8a1 at c1 upstream from the switch 14 to the terminal 13c of the first connector 13c. When the switch 14 is open (OFF), the terminals 13c and 13b remain operative for recharging the battery when the terminals 24b and 24c of the charger 25 are connected to the terminals 13b and 13c of the first connector 13.

The motor of the pump unit 6 is switched ON or OFF by means of the contactor 2a of the wired remote control 2 when the two terminals 13a, 13b are under electrical power, which requires that the terminals 21a and 21b of the second connector 21 to be in contact with the terminals 13a and 13b of the first connector 13 and the contactor 2a to provide continuity in the connection between the terminals 21a and 21b in the control 2.

For this purpose, the first connector 13 has a first stud 13d arranged longitudinally in its axial direction $X_3X_3'$ and mounted in such a manner as to be movable in translation in the longitudinal axial direction $X_3X_3'$ within a cavity 133 in the first connector 13.

Thus, when the second connector 21 is connected to the first connector with the terminals 21a and 21b fully engaged in the cavities 131 and 132, and in contact with the terminals 13a and 13b, the end plate 21d of the second connector 21 comes into abutment against the front end of said first stud 13d that is movable in translation. This abutment causes the first stud 13d to move in translation until the rear end of the first stud 13d reaches the bottom of the cavity 133 and activates the button 13f of an electrical switch 13e by pressing thereagainst. Pressing on the button 13f in this way re-establishes continuity of the connection of the wire 8b2 providing the connection between the terminal 13b and the negative pole of the battery 8. This enables the terminals 13a and 13b to be electrically connected because the terminal 13a is connected via a wire 8a to the positive pole of battery 8 via the wires 8a1, 8a2, and 8a3, while the switch 14 provides the electrical connection between 8a1 and 8a2.

More precisely, this element 13f is movable in translation in the longitudinal axial direction $X_3X_3'$ of the first connector 13, with its rearward movement (towards the bottom of the cavity 133) under the effect of the rearward movement of the first stud 13d creating the electrical connection between the terminals 13a and 13b and thus simultaneously between the terminals 21a and 21b when the connector 21 is connected and fully engaged in the first connector 13. The element 13f co-operates with return means 13g that move it towards the front so that the electrical contact between the terminals 13a and 13b is eliminated in the absence of abutment and rearward movement of the end plate 21d against the first stud 13d, when the second connector 21 is disconnected from the first connector 13.

The terminals 13a and 13b are mounted on springs 13h in the bottoms of the cavities 131 and 132 so that they are initially in a forward position (furthest away from the bottom of the cavities 131 and 132). Thus, it is ensured that watertight contact occurs via O-rings 40 of the terminals 13a and 13b with the terminals 21a and 21b before the first stud comes into contact with the button 13e, because the first stud is moved rearwards in translation towards the bottom of its cavity 133 simultaneously with the same movement in translation of the terminals 13a and 13b that are already in watertight contact with the terminals 21a and 21b.

The terminals 21a and 21b are provided with end O-rings 40 providing watertight contact between the terminals 21a-21b and the terminals 13a-13b when the second connector 21 is connected in the first connector 13, thus preventing any water penetrating into the hydraulic unit 1 while it is underwater.

Conversely, when the second connector 21 and the first connector 13 are disconnected, the terminals 13a and 13b of the first connector 13 are automatically electrically disconnected because the contact stud 13d returns under the effect of automatic return means 13g to its initial position in translation in which the two female terminals 13a and 13b are not electrically in contact with each other.

The handle 22 of the wired remote control 2 has an electrical contactor 2a mounted in such a manner that it is necessary to press on and hold down the contactor 2a of the handle 22 in order to establish continuity of contact in the wire 20 providing the electrical connection between the terminals 21a and 21b of the second connector to enable the electric motor of the pump unit 6 in the hydraulic unit 1 to be electrically powered 6a after the first and second connectors 13 and 21 have been connected together and the switch 14 switched to ON.

The oil tank 7 adjacent to the pump unit 6 fitted with an electric motor 6a contains a movable piston 7c defining a compartment 7a that is completely filled with oil inside the tank 7 as a result of a spring 7d in the compartment 7b applying pressure to the movable piston 7c. The shape of the tank 7 ensures that it always has a supply of oil 7a when the spring 7d is in its maximally extended position with the piston 7 being moved correspondingly in translation by its maximum amount, as shown in FIG. 7B.

For optimum use of the device of the invention, it needs to be handled by two operators. A first operator dedicated or even connected to the hydraulic unit 1 serves to move and control the circuit breaker switch 14 and possibly also to connect the second connector 21 to the first connector 13 and the flexible hose 30 to the coupling 11. A second operator dedicated to the hydraulic tool 3, preferably holding it in one hand, the hydraulic tool 3 being suspended from the first float 4 via the sling 5 and preferably connected from the beginning to the hydraulic unit 1 via the wired remote control 2 and at least a first flexible hose 30.

In order to switch ON the tool 3, it is appropriate initially to operate the general switch 14 for powering the pump unit 6 from the battery 8, and subsequently to press on the electrical contactor 2a of the handle 22 of the wired remote control in order to switch ON the pump unit 6.

The invention claimed is:

1. A diver assistance device for transporting and/or handling equipment in an underwater environment for performing work, the device comprising at least the following components:
   a floating hydraulic unit comprising a first enclosure, containing an electrical pump unit, a battery capable of electrically powering the electrical pump unit, and a fluid tank, said first enclosure being capable of being immersed by a first ballast;
   at least one hydraulic tool connected or capable of being connected to at least one hydraulic coupling of said floating hydraulic unit via at least one flexible hose;
   at least one independent float, connected to, or capable of being connected to, said at least one hydraulic tool via a sling of adjustable length, said at least one independent float being capable of being immersed by a second ballast; and
   a wired remote control for switching on, or stopping, the electrical pump unit, said wired remote control comprising a handle fitted with an electrical contactor at a first end of an electric wire, a second end of the electric wire being connected or capable of being connected to at least said electrical pump unit.

2. The device according to claim 1, wherein:
   a first electrical connector is fastened to said first enclosure, said first electrical connector being connected to at least said electrical pump unit and to the battery; and
   the second end of the electric wire of said wired remote control is connected to a second electrical connector that may be male or female, and that is capable of being connected to said first electrical connector, which may be female or male, at said floating hydraulic unit.

3. The device according to claim 1, wherein said floating hydraulic unit includes a main circuit breaker switch that is accessible from said first enclosure for causing said electrical pump unit to be electrically powered, or not electrically powered, by said battery, said wired remote control being capable of switching the electrical pump unit on or off when the electrical pump unit is electrically powered by said battery via said main circuit breaker switch.

4. The device according to claim 2, wherein said first electrical connector has two first electrical contact terminals, which are not electrically connected together in said first electrical connector in the absence of said second electrical connector being connected in said first electrical connector, and that become electrically connected together and capable of transmitting an on/off command for said electrical pump unit from said wired remote control only once said second electrical connector of said wired remote control is connected to said first electrical connector.

5. The device according to claim 4, wherein said first electrical connector is a female connector having two first electrical contact terminals at the bottoms of two first cavities, and a first stud movable in translation within a third cavity of said first electrical connector, said movement in translation of said first stud enabling the electrical contact connection to be established between the two first electrical contact terminals of the first electrical connector, and said second electrical connector is a male connector having two male second terminals capable of contacting said first electrical contact terminals within said first cavities, and an abutment element capable of moving said first stud within said third cavity enabling the electrical contact connection to be established between the two first electrical contact terminals of the first electrical connector when said second electrical connector is connected to said first electrical connector.

6. The device according to claim 5, wherein the movement in translation of said first stud in translation within a third cavity actuates a button of a switch that provides continuity of the electrical connection of an electric wire connecting one of said first electrical contact terminals to the battery.

7. The device according to claim 4, wherein said battery is capable of being charged by an independent charger comprising a third electrical connector capable of being connected to one of the two first electrical contact terminals connected to a pole of the battery and to a third terminal of the first electrical connector that is connected to another pole of the battery.

8. The device according to claim 1, wherein said fluid tank of the floating hydraulic unit includes a movable piston capable of being moved by a spring so as to confine the fluid permanently in a space that is completely filled with the fluid.

9. The device according to claim 1, wherein said wired remote control comprises a handle capable of being fastened to said at least one hydraulic tool.

10. The device according to claim 9, wherein said at least one hydraulic tool comprises a coupling capable of enabling said handle to be fastened to said at least one hydraulic tool via a coupling of said handle, said fastening of said handle enabling locking and unlocking to be performed by combined movement in translation and in rotation of the coupling of the handle relative to the coupling of the at least one hydraulic tool, and said fastening of the handle enabling the handle to move in rotation relative to the at least one hydraulic tool once said handle is locked, said movement in relative rotation of the handle being capable of controlling the passage of oil via the hydraulic coupling of the at least one hydraulic tool and said flexible hose, at least for returning oil to the floating hydraulic unit.

11. The device according to claim 1, wherein said first enclosure of said floating hydraulic unit is cylindrical in shape and includes a plurality of first lateral external compartments that are accessible from the outside, and capable of receiving said first ballast, said first lateral external compartments being positioned and distributed in such a manner as to be capable of causing the axial longitudinal direction of said first enclosure to adopt a horizontal position, or a vertical position, depending on the positioning and the quantity of said first ballast in the plurality of first lateral external compartments.

12. The device according to claim 1, wherein said at least one independent float is cylindrical, and includes a plurality of second lateral external compartments accessible from the outside, and capable of receiving said second ballast, and said at least one independent float including at least two fastener hooks, capable of enabling one end of said sling to be fastened thereto, said at least two fastener hooks being positioned to enable the axial longitudinal direction of the at least one independent float to adopt a horizontal position, or a vertical position, depending on the positioning of the sling on one or the other of said at least two fastener hooks, and depending on the positioning and the quantity of said second ballast in the plurality of second lateral external compartments.

13. The device according to claim 1, wherein said at least one hydraulic tool is selected from the group consisting of shears, a clamp, a spreader, a jack, a drill, and a saw.

14. A method of transporting and/or performing work in an underwater environment using a diver assistance device according to claim 1, wherein said components are transported in an underwater environment together with at least said at least one hydraulic tool suspended from said at least one independent float in an underwater position.

15. The method according to claim 14, wherein the device is used for taking action underwater, by adjusting the immersion depth of said floating hydraulic unit and of said at least one independent float by controlling their buoyancy by adding said first ballast and said second ballast in said plurality of first external compartments and said plurality of second external compartments, and by adjusting the length of said sling providing the connection between said at least one hydraulic tool and said at least one independent float.

* * * * *